(12) United States Patent
Oguchi

(10) Patent No.: US 8,709,103 B2
(45) Date of Patent: Apr. 29, 2014

(54) SUBLIMATION TRANSFER INK, METHOD FOR PRODUCING A DYED ARTICLE, AND DYED ARTICLE

(71) Applicant: Seiko Epson Corporation, Tokyo (JP)

(72) Inventor: Hideki Oguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/762,467

(22) Filed: Feb. 8, 2013

(65) Prior Publication Data

US 2013/0205517 A1 Aug. 15, 2013

(30) Foreign Application Priority Data

Feb. 9, 2012 (JP) ................................ 2012-026489

(51) Int. Cl.
*D06P 5/28* (2006.01)
*B41J 2/05* (2006.01)

(52) U.S. Cl.
USPC .................. 8/445; 8/470; 8/471; 347/103

(58) Field of Classification Search
USPC ............................. 8/445, 470, 471; 347/103
See application file for complete search history.

(56) References Cited

U.S. PATENT DOCUMENTS

| 6,409,330 B1 * | 6/2002 | Nakamura et al. ............ 347/103 |
| 8,263,682 B1 * | 9/2012 | Papaiacovou et al. ........ 523/160 |
| 2005/0036019 A1 | 2/2005 | Maekawa et al. |
| 2005/0093947 A1 | 5/2005 | Maekawa et al. |
| 2008/0070009 A1 | 3/2008 | Akatani et al. |

FOREIGN PATENT DOCUMENTS

| JP | 3515779 B1 | 4/2004 |
| JP | 3573156 B2 | 10/2004 |
| JP | 2011-021133 A | 2/2011 |
| WO | 2005-121263 A1 | 12/2005 |

* cited by examiner

*Primary Examiner* — Eisa Elhilo
(74) *Attorney, Agent, or Firm* — Nutter McClennen & Fish LLP; John J. Penny, Jr.; Inna Dahlin

(57) ABSTRACT

A sublimation transfer ink to be discharged by an ink jet process contains water, a sublimation dye, and a trehalose-based compound. The amount of the trehalose-based compound in the sublimation transfer ink is preferably in the range of 3% by mass to 20% by mass, both inclusive.

19 Claims, No Drawings

SUBLIMATION TRANSFER INK, METHOD FOR PRODUCING A DYED ARTICLE, AND DYED ARTICLE

The entire disclosure of Japanese Application No.: 2012-026489 filed on Feb. 9, 2012 is expressly incorporated by reference herein.

BACKGROUND

1. Technical Field

The present invention relates to a sublimation transfer ink, a method for producing a dyed article, and a dyed article.

2. Related Art

Sublimation transfer is a technique widely used to dye fabrics or other materials, and there are various dyeing methods based on sublimation transfer. In one of these, an image is printed on a sheet-shaped intermediate transfer medium (e.g., a sheet of paper) by an ink jet process and the intermediate medium is then placed on a substrate (e.g., a piece of fabric) and heated, transferring the image by sublimation. In another method, the substrate (e.g., a piece of film) has a detachable ink-receiving layer. An image is printed on this ink-receiving layer by ink jet printing, and the substrate is heated. After the ink sublimes and diffuses into the substrate located beneath and the substrate is dyed, the ink-receiving layer is removed. These methods involve the use of an ink containing a sublimation dye (a sublimation transfer ink).

Sublimation transfer inks usually contain water besides a sublimation dye. In addition to these ingredients, many inks contain glycerol so as not to clog the nozzles of the ink jet head used therewith, to ensure sufficient discharge stability, and for other purposes (e.g., see International Publication No. WO 2005/121263).

Dyeing methods based on sublimation transfer include heating, which causes glycerol to be evaporated together with water. Because of the high boiling point of glycerol, the generated vapor of glycerol is rapidly cooled below the condensation temperature and condenses, producing misty vapor (smoke). The produced misty vapor (smoke) seriously affects the workplace environment; for example, it obscures the operator's vision and leads to significantly reduced productivity of dyed articles.

SUMMARY

Advantages of some aspects of the invention include the following: they provide a sublimation transfer ink that offers excellent discharge stability in ink jet processes and is unlikely to produce misty vapor (smoke) on heating; they provide a method for producing a dyed article that makes the manufacturing of dyed articles using a sublimation transfer ink more productive; and they provide a dyed article produced by this method.

To achieve these advantages, aspects of the invention are configured as follows.

The sublimation transfer ink according to an aspect of the invention, which is to be discharged by an ink jet process, contains: water; a sublimation dye; and a trehalose-based compound.

This configuration provides a sublimation transfer ink that offers excellent discharge stability in ink jet processes and is unlikely to produce misty vapor (smoke) on heating (the generation of smoke from the ink is effectively prevented).

In the sublimation transfer ink according to this aspect of the invention, the trehalose-based compound is preferably trehalose.

This arrangement greatly improves the stability of the images produced by discharging and drying the sublimation transfer ink while maintaining the excellent properties of the ink, such as moisture retention in an ink jet head and discharge stability. Due to its nature, trehalose is very unlikely to change its characteristics when it is dried. The use of this compound therefore leads to greatly improved productivity of dyed articles and greatly improved reliability of the dyed articles produced.

The amount of the trehalose-based compound in the sublimation transfer ink according to this aspect of the invention is preferably in the range of 3% by mass to 20% by mass, both inclusive.

This arrangement has several advantages. The discharge stability of the sublimation transfer ink is further improved while the generation of smoke from the ink is effectively prevented. Sublimation transfer (heating) can be carried out under milder conditions, leading to greatly improved productivity of dyed articles. Furthermore, this arrangement contributes to energy conservation.

The total amount of solvents with a boiling point of 200° C. or more in the sublimation transfer ink according to this aspect of the invention is preferably 3% by mass or less.

This makes the ink more unlikely to produce misty vapor (smoke) on heating.

The sublimation transfer ink according to this aspect of the invention preferably further contains propylene glycol.

This arrangement greatly improves the moisture retention and discharge stability of the sublimation transfer ink while the generation of smoke from the ink is effectively prevented.

The sublimation transfer ink according to this aspect of the invention preferably contains 0.1% by mass to 10% by mass, both inclusive, of propylene glycol.

This arrangement leads to more effective prevention of the generation of misty vapor (smoke) from the ink and greatly improved moisture retention of the ink. As a result, the reliability of the dyed articles produced using the sublimation transfer ink is further improved.

The method for producing a dyed article according to another aspect of the invention includes: applying a sublimation transfer ink according to an aspect of the invention to an intermediate transfer medium by an ink jet process; and transferring the sublimation dye contained in the sublimation transfer ink to a substrate by heating the intermediate transfer medium, to which the sublimation transfer ink has been applied, with the intermediate transfer medium facing the substrate.

This configuration provides a method for producing a dyed article that makes the manufacturing of dyed articles using a sublimation transfer ink more productive.

In the production method of a dyed article according to this aspect of the invention, the intermediate transfer medium is preferably heated at a temperature of 160° C. to 220° C., both inclusive.

This arrangement reduces the energy requirement for ink transfer and thus leads to greatly improved productivity of dyed articles. The reliability of the dyed articles produced is also greatly improved.

The dyed article according to yet another aspect of the invention is produced using a sublimation transfer ink according to an aspect of the invention.

This article, dyed by sublimation transfer, is highly reliable.

DESCRIPTION OF EXEMPLARY EMBODIMENTS

The following describes some preferred embodiments of the invention in detail.

Sublimation Transfer Ink

An embodiment of the invention is a sublimation transfer ink.

As described above, sublimation transfer has been widely used as a technique for dyeing fabrics or other materials, and there are various dyeing methods based on sublimation transfer. In one of these, an image is printed on a sheet-shaped intermediate transfer medium (e.g., a sheet of paper) by an ink jet process and then the intermediate medium is placed on the substrate (e.g., a piece of fabric) and heated, transferring the image by sublimation. In another method, the substrate (e.g., a piece of film) has a detachable ink-receiving layer. An image is printed on this ink-receiving layer by ink jet printing and the substrate is heated. After the ink sublimes and diffuses into the substrate located beneath and the substrate is dyed, the ink-receiving layer is removed. These methods involve the use of an ink containing a sublimation dye (a sublimation transfer ink).

Sublimation transfer inks usually contain water besides a sublimation dye. In addition to these ingredients, many inks contain glycerol so as not to clog the nozzles of the ink jet head used therewith, to ensure sufficient discharge stability, and for other purposes.

Dyeing methods based on sublimation transfer include heating, which causes glycerol to be evaporated together with water. However, glycerol has a high boiling point; the generated vapor of glycerol is rapidly cooled below its condensation temperature and condenses, producing misty vapor (smoke). The produced misty vapor (smoke) seriously affects the workplace environment; for example, it obscures the operator's vision and thus significantly reduces the productivity of dyed articles.

After extensive research for a solution to these and related problems, the inventor conceived of aspects of the invention including those detailed below.

The sublimation transfer ink according to an aspect of the invention, which is to be discharged by an ink jet process, contains water, a sublimation dye, and a trehalose-based compound. This configuration completely prevents the above and related problems from occurring. In other words, this configuration provides a sublimation transfer ink that offers excellent discharge stability in ink jet processes and is unlikely to produce misty vapor (smoke) on heating (the generation of smoke from the ink is effectively prevented).

In the following, the individual components of the sublimation transfer ink according to this embodiment of the invention are described.

Water

The sublimation transfer ink according to this embodiment of the invention contains water.

Water has two functions: a dispersion medium for dispersing the sublimation dye, and a solvent for dissolving the trehalose-based compound. The sublimation dye and the trehalose-based compound will be described in detail later herein.

The presence of water allows the viscosity and surface tension of the sublimation transfer ink to be suitably adjusted to fall within their respective preferred ranges and makes the ink very easy to discharge by an ink jet process. Water is also important for improved productivity of dyed articles because this component can be easily removed after the ink is discharged by an ink jet process. Furthermore, water is essential for ensuring the safety of those who are engaged in the production of dyed articles because it is an extremely safe substance for the human body and many things.

Any amount of water can be contained in the sublimation transfer ink. However, the water content is preferably in the range of 50% by mass to 90% by mass, both inclusive, more preferably 55% by mass to 70% by mass, both inclusive.

Sublimation Dye

Sublimation dyes are dyes that sublime when they are heated.

The sublimation dye used in this embodiment can be a disperse dye, a solvent dye, or any other kind of dye as long as it can behave as described above. Specific examples of suitable dyes include the following: C.I. Disperse Yellow 3, 7, 8, 23, 39, 51, 54, 60, 71, and 86; C.I. Disperse Orange 1, 1:1, 5, 20, 25, 25:1, 33, 56, and 76; C.I. Disperse Brown 2; C.I. Disperse Red 11, 50, 53, 55, 55:1, 59, 60, 65, 70, 75, 93, 146, 158, 190, 190:1, 207, 239, and 240; C.I. Vat Red 41; C.I. Disperse Violet 8, 17, 23, 27, 28, 29, 36, and 57; C.I. Disperse Blue 19, 26, 26:1, 35, 55, 56, 58, 64, 64:1, 72, 72:1, 81, 81:1, 91, 95, 108, 131, 141, 145, and 359; and C.I. Solvent Blue 36, 63, 105, and 111. One or a combination of two or more suitable dyes can be used.

From the viewpoint of the storage stability of the sublimation transfer ink, the following dyes are preferred: C.I. Disperse Yellow 3, 7, 8, 23, 51, 54, 60, 71, and 86; C.I. Disperse Orange 20, 25, 25:1, 56, and 76; C.I. Disperse Brown 2; C.I. Disperse Red 11, 53, 55, 55:1, 59, 60, 65, 70, 75, 146, 190, 190:1, 207, 239, and 240; C.I. Vat Red 41; C.I. Disperse Violet 8, 17, 23, 27, 28, 29, 36, and 57; C.I. Disperse Blue 26, 26:1, 55, 56, 58, 64, 64:1, 72, 72:1, 81, 81:1, 91, 95, 108, 131, 141, 145, and 359; and C.I. Solvent Blue 36, 63, 105, and 111.

Trehalose-Based Compound

As mentioned above, the sublimation transfer ink according to this embodiment of the invention contains a trehalose-based compound. This imparts excellent discharge stability in ink jet processes to the sublimation transfer ink and effectively prevents the generation of misty vapor (smoke) from heated ink. The term trehalose-based compound, as used in the present invention, refers to a disaccharide consisting of two glucose molecules bonded through their reducing groups and, more specifically, refers to one of the following three optical isomers: α,α-trehalose (O-α-D-glucopyranosyl-α-D-glucopyranoside; herein simply referred to as trehalose), α,β-trehalose (neotrehalose), and β,β-trehalose (isotrehalose).

The presence of the trehalose-based compound makes the sublimation transfer ink suitable for use with a wide variety of recording media (e.g., an intermediate transfer medium). Once the sublimation transfer ink is applied to a recording medium, the trehalose-based compound, which is highly soluble in water and has a high water retention capacity, effectively prevents the recording medium from being deformed (e.g., curling). The use of this compound also allows the sublimation transfer ink to be applied to a recording medium with a higher duty and thus contributes to improve the range of colors reproduced on the print (color gamut).

The trehalose-based compound also makes the records obtained using the sublimation transfer ink less likely to form condensation in humid environments (e.g., a temperature of 20° C. and a relative humidity of 60%).

Furthermore, the presence of the trehalose-based compound in the sublimation transfer ink helps the head used with the ink quickly recover from clogging, especially while the head is capped. The exact reason for this is unclear; however, one possibility is the low hygroscopicity of the sublimation transfer ink. It appears that the water content of the portion of the ink filled in the head is not attracted to the portion remaining in the cap and thus the head can quickly recover from clogging while it is sealed with the cap.

The trehalose-based compound also contributes to improved low-temperature storage stability of the sublimation transfer ink by preventing ice crystals from growing in the ink.

Trehalose is a non-reducing disaccharide consisting of two glucose molecules connected with a 1,1-glucoside bond. Due to its nature as a non-reducing sugar, this compound does not undergo the Maillard browning reaction and thus is particularly preferred for the purpose of preventing image quality deterioration during the sublimation transfer (heating) of the sublimation transfer ink and from the viewpoint of the storage stability of the ink. Furthermore, the especially high solubility in water and water retention capacity in combination with very low hygroscopicity are unique properties of trehalose. More specifically, high-purity anhydrous trehalose is extremely soluble in water (69 g/100 g at 20° C.) but is not hygroscopic at a humidity of 95% or less. Trehalose does not absorb water unless it is in contact with water; this compound is non-hygroscopic and stable in normal environments (a temperature of 20° C. and a humidity of about 45%). Because of this, the use of trehalose greatly improves the stability of the images produced by discharging and drying the sublimation transfer ink while maintaining the excellent properties of the ink, such as moisture retention in an ink jet head and discharge stability. Furthermore, trehalose is very unlikely to change its characteristics when it is dried. The use of this compound therefore leads to greatly improved productivity of dyed articles and greatly improved reliability of the dyed articles produced.

The amount of the trehalose-based compound in the sublimation transfer ink is preferably in the range of 3% by mass to 20% by mass, both inclusive, more preferably 3% by mass to 18% by mass, both inclusive. This ensures that the discharge stability of the sublimation transfer ink is further improved while the generation of smoke from the ink is effectively prevented and that sublimation transfer (heating) can be carried out under milder conditions, leading to greatly improved productivity of dyed articles. Furthermore, this contributes to energy conservation. When the sublimation transfer ink contains two or more trehalose-based compounds, it is preferred that the total amount of them is in the above range.

Propylene Glycol

The sublimation transfer ink according to this embodiment of the invention preferably further contains propylene glycol. The presence of this polyhydric alcohol with a boiling point not higher than 200° C. greatly improves the moisture retention and discharge stability of the sublimation transfer ink.

The propylene glycol content of the sublimation transfer ink is preferably in the range of 0.1% by mass to 10% by mass, both inclusive, more preferably 1% by mass to 3% by mass, both inclusive. This leads to more effective prevention of the generation of misty vapor (smoke) from the ink and greatly improved moisture retention of the ink. As a result, the reliability of the dyed articles produced using the sublimation transfer ink is further improved.

Solvent

The sublimation transfer ink according to this embodiment of the invention may contain a solvent in addition to the ingredients described above. Polyols other than trehalose-based compounds as well as glycol ethers, among others, can be used. Examples of suitable non-trehalose polyols include polyols (preferably, diols) having two to six carbon atoms in the molecule with or without one intramolecular ether bond. Specific examples include the following: glycerol, ethylene glycol, diethylene glycol, triethylene glycol, propylene glycol, dipropylene glycol, 1,3-propanediol, 1,2-butanediol, 1,3-butanediol, 1,4-butanediol, 2,3-butanediol, 3-methyl-1,3-butanediol, 1,2-pentanediol, 1,5-pentanediol, 2-methyl-2,4-pentanediol, 3-methyl-1,5-pentanediol, 1,2-hexanediol, and 1,6-hexanediol.

The sublimation transfer ink according to this embodiment of the invention may contain a glycol ether. When a glycol ether is used, it is preferred that the glycol ether is a glycol monoalkyl ether selected from the group consisting of ethylene glycol, diethylene glycol, triethylene glycol, propylene glycol, dipropylene glycol, and tripropylene glycol. Specific examples of preferred glycol ethers include triethylene glycol monomethyl ether, triethylene glycol monobutyl ether, and dipropylene glycol monopropyl ether.

As for solvents with a boiling point of 200° C. or more, however, their total amount in the sublimation transfer ink according to this embodiment of the invention is preferably 3% by mass or less, more preferably 1% by mass or less. This makes the ink more unlikely to produce misty vapor (smoke) on heating.

Additives

The sublimation transfer ink according to this embodiment of the invention may contain ingredients other than those described above (additives). Examples of suitable additives include dispersants, preservatives/antimolds, pH-adjusting agents, chelating agents, antirusts, ultraviolet absorbents, antifoams, surface tension modifiers, polysiloxanes, and polyols other than trehalose-based compounds.

Adding a dispersant to the sublimation transfer ink greatly improves the dispersion stability of the sublimation dye in the sublimation transfer ink and thus has great positive impact on the characteristics of the ink such as storage stability and discharge stability (clogging recoverability). The reliability of the dyed articles produced using the sublimation transfer ink is also greatly improved.

All kinds of dispersants can be used. Examples include anionic dispersants, nonionic dispersants, and polymeric dispersants.

Examples of preferred anionic dispersants include condensation products of formaldehyde with an aromatic sulfonic acid.

Examples of aromatic sulfonic acids that can form a condensation product with formaldehyde include the following: creosote oil sulfonic acid, cresol sulfonic acid, phenol sulfonic acid, β-naphthol sulfonic acid, alkyl naphthalene sulfonic acids such as methyl naphthalene sulfonic acid or butyl naphthalene sulfonic acid, mixtures of β-naphthalene sulfonic acid and β-naphthol sulfonic acid, mixtures of cresol sulfonic acid and 2-naphthol-6-sulfonic acid, and lignin sulfonic acid.

Some other examples of preferred anionic dispersants are condensation products of formaldehyde with β-naphthalene sulfonic acid, with an alkyl naphthalene sulfonic acid, or with creosol oil sulfonic acid.

Examples of nonionic dispersants that can be used include ethylene oxide adducts of a phytosterol or cholestanol.

The term phytosterol, as used herein, means both the native and hydrogenated forms of a phytosterol. For example, ethylene oxide adducts of a phytosterol include those of the native and hydrogenated forms of the phytosterol.

Likewise, the term cholestanol, as used herein, means both the native and hydrogenated forms of cholestanol. For example, ethylene oxide adducts of cholestanol include those of native cholestanol and hydrogenated cholestanol. When an ethylene oxide adduct of a phytosterol or cholestanol is used, it is preferred that the amount of ethylene oxide added is in the range of 10 mol to 50 mol, both inclusive, per 1 mol of the phytosterol or cholestanol and the HLB (hydrophile-lipophile balance) number is in the range of 13 to 20, both inclusive.

As for polymeric dispersants, examples include polyacrylic acids partially esterified with an alkyl group, polyalkylene polyamines, polyacrylates, styrene-acrylic acid copolymers, and vinyl naphthalene-maleic acid copolymers.

Examples of preservatives/antimolds that can be used include the compounds of the following types: organosulfur, organonitrogen-sulfur, organohalogen, haloallylsulfone, iodopropargyl, N-haloalkylthio, benzothiazole, nitrile, pyridine, 8-oxyquinoline, isothiazolin, dithiol, pyridine oxide, nitropropane, organotin, phenol, quaternary ammonium salt, triazine, thiadiazine, anilide, adamantane, dithiocarbamate, bromoindanone, benzyl bromoacetate, and inorganic salt. Specific examples include sodium pentachlorophenol as an organohalogen compound, sodium pyridinethione-1-oxide and zinc pyridinethione-1-oxide as pyridine oxides, and amine salts of 1-benzisothiazolin-3-one, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, and 2-methyl-4-isothiazolin-3-one calcium chloride as isothiazolins. Some other examples of preservative/antimolds that can be used are sodium dehydroacetate, sodium sorbate, and sodium benzoate.

Adding a pH-adjusting agent to the sublimation transfer ink greatly improves the characteristics of the ink such as storage stability. The reliability of the dyed articles produced using the sublimation transfer ink is also greatly improved.

Examples of suitable pH-adjusting agents include ones with which the pH of the sublimation transfer ink can be adjusted to be within the range of 6.0 to 11.0, both inclusive. Specific examples of such pH-adjusting agents include the following: alkanolamines such as diethanolamine, triethanolamine, dimethylethanolamine, and diethylethanolamine; alkali metal hydroxides such as lithium hydroxide, sodium hydroxide, and potassium hydroxide; ammonium hydroxide; alkali metal carbonates such as lithium carbonate, sodium carbonate, and potassium carbonate; and aminosulfonic acids such as taurine.

Examples of chelating agents that can be used include disodium ethylenediaminetetraacetate, sodium nitrilotriacetate, sodium hydroxyethyl ethylenediaminetriacetate, sodium diethylenetriaminepentaacetate, and sodium uracil diacetate.

Examples of antirusts that can be used include bisulfites, sodium thiosulfate, ammonium thioglycolate, diisopropylammonium nitrite, pentaerythritol tetranitrate, dicyclohexylammonium nitrite, and benzotriazoles.

Examples of ultraviolet absorbents that can be used include the compounds of the following types: benzophenone, cinnamic acid, triazine, and stilbene. The "fluorescent brighteners" (compounds that absorb ultraviolet light and emit fluorescent light, represented by benzoxazoles) can also be used.

Examples of antifoams that can be used include the compounds of the following types: highly oxidized oil, glycerol fatty acid esters, fluoride, silicone, and acetylene.

Examples of surface tension modifiers that can be used include surfactants, such as anionic surfactants, amphoteric surfactants, cationic surfactants, and nonionic surfactants.

For anionic surfactants, examples include alkyl sulfocarboxylates, α-olefin sulfonates, polyoxyethylene alkyl ether acetates, N-acyl amino acid and its salts, N-acyl methyl taurate, alkyl sulfate polyoxyalkyl ether sulfates, alkyl sulfate polyoxyethylene alkyl ether phosphates, rosin acid soap, sulfated castor oil, lauryl alcohol sulfate, alkylphenolic phosphates, alkyl phosphates, alkyl aryl sulfonates, diethyl sulfosuccinate, diethylhexyl sulfosuccinate, and dioctyl sulfosuccinate.

For amphoteric surfactants, examples include lauryl dimethylaminoacetic acid betaine, 2-alkyl-N-carboxymethyl-N-hydroxyethyl imidazolinium betaine, coconut oil fatty acid amide propyldimethylaminoacetic acid betaine, polyoctyl polyaminoethyl glycine, and other imidazoline derivatives.

For cationic surfactants, examples include 2-vinylpyridine derivatives and poly(4-vinylpyridine) derivatives.

For nonionic surfactants, examples include the following: ether-based surfactants such as polyoxyethylene nonyl phenyl ether, polyoxyethylene octyl phenyl ether, polyoxyethylene dodecyl phenyl ether, polyoxyethylene oleyl ether, polyoxyethylene lauryl ether, and polyoxyethylene alkyl ethers; ester-based surfactants such as polyoxyethylene oleates, polyoxyethylene distearates, sorbitan laurate, sorbitan monostearate, sorbitan monooleate, sorbitan sesquioleate, polyoxyethylene monooleates, and polyoxyethylene stearates; and acetylene glycol (alcohol)-based surfactants such as 2,4,7,9-tetramethyl-5-decyne-4,7-diol, 3,6-dimethyl-4-octyne-3,6-diol, and 3,5-dimethyl-1-hexyn-3-ol.

Adding a polysiloxane to the sublimation transfer ink improves the response of droplets of the ink to discharge by an ink jet process. Examples of polysiloxanes that can be used include polyether-modified siloxanes and polyether-modified polydimethylsiloxane.

The surface tension (at 25° C.) of the sublimation transfer ink according to this embodiment of the invention is preferably in the range of 20 mN/m to 50 mN/m, both inclusive, more preferably 25 mN/m to 40 mN/m, both inclusive. The surface tension of a sublimation transfer ink can be determined by measurement using CBVP-A3 surface tensiometer (manufactured by Kyowa Interface Science Co., Ltd.) in accordance with JIS K3362.

The viscosity (at 25° C.) of the sublimation transfer ink according to this embodiment of the invention is preferably in the range of 2 mPa·s to 20 mPa·s, both inclusive. This greatly improves the characteristics of the sublimation transfer ink such as discharge stability (e.g., the precision of the amount of ink discharged, the dynamics of flying droplets) and response to discharge (e.g., response speed, response to high frequencies [frequency response]). The viscosity of a sublimation transfer ink can be determined by measurement using a vibrational viscometer in accordance with JIS Z8809.

Method for Manufacturing a Dyed Article

Another embodiment of the invention is a method for manufacturing a dyed article.

The method for manufacturing a dyed article according to this embodiment of the invention includes (1a) applying a sublimation transfer ink according to an aspect of the invention (e.g., the sublimation transfer ink according to the above embodiment) to an intermediate transfer medium by an ink jet process and (1b) transferring the sublimation dye contained in the sublimation transfer ink to a substrate by heating the intermediate transfer medium, to which the sublimation transfer ink has been applied, with the intermediate transfer medium facing the substrate. This configuration provides a method for manufacturing a dyed article that makes the fabrication of dyed articles using a sublimation transfer ink more productive.

The following describes this method in more detail.

Ink Application

A sublimation transfer ink according to an aspect of the invention is applied to an intermediate transfer medium by an ink jet process (1a).

Any known droplet discharge apparatus can be used to discharge the sublimation transfer ink by an ink jet process.

Several mechanisms for droplet discharge (ink jet processes) can be used, including piezoelectric force, bubbles formed by heating the ink, and so forth. However, the piezoelectric mechanism is preferred from viewpoints such as the prevention of the deterioration of the sublimation transfer ink.

Examples of intermediate transfer media that can be used include plain paper and other kinds of paper as well as recording media having an ink-receiving layer (referred to as ink jet paper, coated paper, or the like). However, it is preferred to use paper coated with silica or any other particulate inorganic material to form an ink-receiving layer. This prevents bleeding and other defects of the intermediate record obtained while the sublimation transfer ink applied to the intermediate transfer medium is dried, and also helps the sublimation dye sublime while the ink is transferred.

It is allowed that two or more inks are used. This offers some advantages such as an extended color gamut.

Ink Transfer

The sublimation dye contained in the sublimation transfer ink is transferred to a substrate by heating the intermediate transfer medium, to which the sublimation transfer ink has been applied, with the intermediate transfer medium facing the substrate (1b). As a result, a dyed article is obtained.

The heating temperature is preferably in the range of 160° C. to 220° C., both inclusive, more preferably 170° C. to 200° C., both inclusive. This reduces the energy requirement for ink transfer and thus leads to greatly improved productivity of dyed articles. The reliability of the dyed articles produced is also greatly improved.

Depending on the heating temperature, the heating time is preferably in the range of 30 seconds to 90 seconds, both inclusive, more preferably 45 seconds to 60 seconds, both inclusive. This also reduces the energy requirement for ink transfer, leading to greatly improved productivity of dyed articles, and greatly improves the reliability of the dyed articles produced.

As mentioned above, the intermediate transfer medium, carrying the sublimation transfer ink, faces the substrate while it is heated. Preferably, the intermediate transfer medium is in close contact with the substrate while it is heated. This also reduces the energy requirement for ink transfer, leading to greatly improved productivity of dyed articles, and greatly improves the reliability of the dyed articles produced.

All shapes and kinds of substrates can be used. Examples of suitable substrates include sheet-shaped ones such as fabrics (e.g., hydrophobic fiber cloth), resin (plastic) films, and paper. Non-sheet-shaped substrates, or substrates having a three-dimensional shape, can also be used, including spherical and box-shaped substrates.

Substrate materials other than resins, plastics, and paper are also allowed. For example, glass, metallic, and ceramic substrates can be used.

When the substrate is a piece of fabric, examples of fibers of which the substrate can be made include polyester fiber, nylon fiber, triacetate fiber, diacetate fiber, polyamide fiber, and blends of two or more of these fibers. Blends of such a fiber with a regenerated fiber (e.g., rayon) or a natural fiber (e.g., cotton, silk, or wool) can also be used.

Examples of resin (plastic) films that can be used as the substrate include polyester, polyurethane, polycarbonate, polyphenylene sulfide, polyimide, and polyamide-imide films. When the substrate is a piece of resin (plastic) film, it may be a laminate consisting of two or more layers stacked or be made of a gradient material, i.e., a material having a gradient in the composition.

Dyed Article

Yet another embodiment of the invention is a dyed article.

The dyed article according to this embodiment of the invention is produced using a sublimation transfer ink according to an aspect of the invention (e.g., the sublimation transfer ink according to the above embodiment). This article, dyed by sublimation transfer, is highly reliable.

The dyed article according to this embodiment of the invention has a wide variety of applications including clothes such as T-shirts and sweatshirts, flags and banners, and so forth.

It should be noted that the above preferred embodiments are for illustration purposes only and should not be construed as limiting any aspect of the invention.

For example, the production method according to a different aspect of the invention may additionally include processing the raw materials, the workpiece, and/or the dyed article.

In the production method described above, a dyed article is produced by applying a sublimation transfer ink according to an aspect of the invention to an intermediate transfer medium by an ink jet process and transferring the sublimation dye contained in the sublimation transfer ink to a substrate by heating the intermediate transfer medium, to which the sublimation transfer ink has been applied, with the intermediate transfer medium facing the substrate. The dyed article according to an aspect of the invention, however, is not limited to one that is produced by this method. In another possible method, the substrate (e.g., a piece of film) has a detachable ink-receiving layer. A sublimation transfer ink according to an aspect of the invention is applied to this ink-receiving layer by an ink jet process, and the substrate is heated. After the ink sublimes and diffuses into the substrate located beneath and the substrate is dyed, the ink-receiving layer is removed.

The invention is never limited to the embodiments described above, and various modifications are allowed. For example, the invention includes constitutions that are substantially the same as the embodiment described above (e.g., ones that have the same function, are based on the same method, and provide the same results as the embodiment, or ones for the same purposes and advantages as the embodiment). Furthermore, the invention includes constitutions obtained by changing any nonessential part or parts of the embodiment described above. Moreover, the invention includes constitutions having the same operations and offering the same advantages as the embodiment described above and constitutions that can achieve the same purposes as the embodiment described above. Additionally, the invention includes constitutions obtained by adding any known technology or technologies to the embodiment described above.

An example of other suitable applications of the invention is sublimation transfer carried out without using any intermediate transfer medium. In this application, a dyed article is obtained by applying the ink directly to a piece of fabric as a substrate and then heating the substrate. The generation of smoke from the ink is also effectively prevented in this application, of course.

EXAMPLES

1. Preparation of Sublimation Transfer Inks

Sublimation transfer inks were prepared in the following way.

Example 1

A sublimation dye (C.I. Disperse Yellow 54), a polymeric dispersant (a styrene-acrylic acid copolymer), and ion-exchanged water were mixed. In a sand mill, the mixture was cooled and dispersed with 0.2-mm glass beads for about 15 hours. The dispersion was diluted with ion-exchanged water, and the diluted dispersion was filtered through GC-50 glass fiber filter (manufactured by Toyo Roshi Kaisha, Ltd.; pore size: 0.5%). In this way, an aqueous dispersion containing no coarse particles was obtained.

This aqueous dispersion was mixed with trehalose, triethylene glycol monomethyl ether, and ion-exchanged water in specified proportions to yield a sublimation transfer ink.

Examples 2 to 9

Sublimation transfer inks were prepared in the same way as Example 1 except that the ingredients and their amounts were changed in accordance with the formulae specified in Table 1.

Comparative Examples 1 to 5

Sublimation transfer inks were prepared in the same way as Example 1 except that the ingredients and their amounts were changed in accordance with the formulae specified in Table 1.

Table 1 summarizes the formulae of the sublimation transfer inks of Examples and Comparative Examples along with related information.

The meanings of the abbreviations used in Table 1 are as follows: DY54, C.I. Disperse Yellow 54 (a sublimation dye); TR, trehalose; ITR, isotrehalose; NTR, neotrehalose; TEGMME, triethylene glycol monomethyl ether; SA, a styrene-acrylic acid copolymer (a polymeric dispersant); PG, propylene glycol; GL, glycerol; SO, D-sorbitol; XY, xylitol; MA, maltitol.

For all of the sublimation transfer inks prepared as examples of an aspect of the invention, the surface tension at 25° C. measured using CBVP-A3 surface tensiometer (manufactured by Kyowa Interface Science Co., Ltd.) in accordance with JIS K3362 was in the range of 25 mN/m to 40 mN/m, both inclusive, and the viscosity at 25° C. measured using a vibrational viscometer in accordance with JIS 28809 was in the range of 2 mPa·s to 20 mPa·s, both inclusive.

TABLE 1

Table 1

Formulae of sublimation transfer inks

| | Water | Sublimation dye | | Trehalose-based compound | | TEGMME | Dispersant | | Others | |
|---|---|---|---|---|---|---|---|---|---|---|
| | Content [% by mass] | Kind | Content [% by mass] | Kind | Content [% by mass] | Content [% by mass] | Kind | Content [% by mass] | Kind | Content [% by mass] |
| Example 1 | 89.5 | DY54 | 2.5 | TR | 3.0 | 1.0 | SA | 1.0 | GL | 3.0 |
| Example 2 | 82.5 | DY54 | 2.5 | TR | 10 | 1.0 | SA | 1.0 | GL | 3.0 |
| Example 3 | 72.5 | DY54 | 2.5 | TR | 20 | 1.0 | SA | 1.0 | GL | 3.0 |
| Example 4 | 72.5 | DY54 | 2.5 | ITR | 20 | 1.0 | SA | 1.0 | GL | 3.0 |
| Example 5 | 72.5 | DY54 | 2.5 | NTR | 20 | 1.0 | SA | 1.0 | GL | 3.0 |
| Example 6 | 83.5 | DY54 | 2.5 | TR | 10 | 1.0 | SA | 1.0 | GL | 2.0 |
| Example 7 | 80.5 | DY54 | 2.5 | TR | 10 | 1.0 | SA | 1.0 | GL/PG | 2.0/3.0 |
| Example 8 | 82.5 | DY54 | 2.5 | TR | 10 | 1.0 | SA | 1.0 | PG | 3.0 |
| Example 9 | 80.5 | DY54 | 2.5 | TR | 10 | 1.0 | SA | 1.0 | PG | 5.0 |
| Comparative Example 1 | 75.5 | DY54 | 2.5 | — | — | 1.0 | SA | 1.0 | GL | 20 |
| Comparative Example 2 | 95.5 | DY54 | 2.5 | — | — | 1.0 | SA | 1.0 | — | — |
| Comparative Example 3 | 72.5 | DY54 | 2.5 | — | — | 1.0 | SA | 1.0 | SO/PG | 20/3.0 |
| Comparative Example 4 | 72.5 | DY54 | 2.5 | — | — | 1.0 | SA | 1.0 | XY/PG | 20/3.0 |
| Comparative Example 5 | 72.5 | DY54 | 2.5 | — | — | 1.0 | SA | 1.0 | MA/PG | 20/3.0 |

2. Recovery from Clogging (Discharge Stability) of the Sublimation Transfer Inks The following test was performed on the sublimation transfer inks of Examples and Comparative Examples.

A droplet discharge apparatus was placed in a chamber (a thermal chamber) and loaded with one of the sublimation transfer inks of Examples and Comparative Examples.

The apparatus was continuously operated for 30 minutes under the following conditions: print resolution, 720×720 dpi; a monochromatic solid image; print width, 1200 mm.

After 48 hours of being left and a routine cleaning operation, the apparatus was operated under the same conditions again, and the successfulness of printing was assessed by the following criteria:

A: The cleaning operation was repeated three times or less until successful printing;
B: The cleaning operation was repeated four to nine times until recovery from clogging and successful printing;
C: The cleaning operation was repeated ten times or more but the printing head did not recover from clogging.

3. Production of Dyed Articles

The sublimation transfer inks of Examples and Comparative Examples were used to produce dyed articles in the following way.

The sublimation transfer ink was put into an ink jet apparatus.

A sheet of paper coated with a silica-containing material to form an ink-receiving layer was prepared as an intermediate transfer medium, and the sublimation transfer ink was applied to the ink-receiving layer of the intermediate transfer medium to draw a predetermined pattern (ink application).

The formed pattern was transferred to a piece of polyester fiber cloth (a substrate) by heating the intermediate transfer medium at 200° C. for 60 seconds using TP-608M heat press (manufactured by Taiyoseiki Co., Ltd.) with the ink-receiving layer of the intermediate transfer medium, carrying the sublimation transfer ink, in close contact with the substrate (ink transfer). In this way, a dyed article was obtained.

4. Generation of Misty Vapor (Smoke) During the Production of a Dyed Article

Each of the sublimation transfer inks was assessed by the following criteria on the basis of how much misty vapor (smoke) it generated while the pattern was transferred in operation 3:

A: The generation of misty vapor (smoke) was almost unnoticeable;
B: Misty vapor (smoke) was produced but disappeared in 5 seconds;
C: Misty vapor (smoke) was produced for more than 5 seconds.

5. Appearance Evaluation

The dyed articles produced in operation 3 were visually inspected and their dyed portion was assessed by the following criteria:

A: The formed pattern exactly matched the intended design;
B: A deviation from the intended design (color bleeding or displacement of characters or lines) was observed.

Table 2 summarizes the results of these three tests.

TABLE 2

| | Discharge stability | Misty vapor (smoke) generation | Appearance |
|---|---|---|---|
| Example 1 | A | B | A |
| Example 2 | A | B | A |
| Example 3 | A | B | A |
| Example 4 | A | B | A |
| Example 5 | A | B | A |
| Example 6 | A | A | A |
| Example 7 | A | A | A |
| Example 8 | A | A | A |
| Example 9 | A | A | A |
| Comparative Example 1 | A | C | B |
| Comparative Example 2 | C | A | A |
| Comparative Example 3 | A | B | B |
| Comparative Example 4 | A | B | B |
| Comparative Example 5 | A | B | B |

As is clear from Table 2, the sublimation transfer inks produced as examples of an aspect of the invention exhibited excellent discharge stability of droplets. These inks were unlikely to produce misty vapor (smoke) during the production of a dyed article, demonstrating that they do not affect the cleanliness and workability of the workplace where they are used and thus can improve the productivity of dyed articles. Furthermore, these inks yielded highly reliable dyed articles with their dyed portion exactly matching the intended design.

What is claimed is:

1. A sublimation transfer ink to be discharged by an ink jet process, comprising:
    water;
    a sublimation dye;
    a trehalose-based compound; and
    a total amount of solvents with a boiling point of 200° C. or more is 3% by mass or less and more then zero.

2. The sublimation transfer ink according to claim 1, wherein the trehalose-based compound is trehalose.

3. The sublimation transfer ink according to claim 1, wherein the amount of the trehalose-based compound in the sublimation transfer ink is in a range of 3% by mass to 20% by mass, both inclusive.

4. The sublimation transfer ink according to claim 1, wherein the total amount of solvents with a boiling point of 200° C. or more is 1% by mass or less and more then zero.

5. The sublimation transfer ink according to claim 1, further comprising propylene glycol.

6. The sublimation transfer ink according to claim 5, wherein the amount of propylene glycol in the sublimation transfer ink is in a range of 0.1% by mass to 10% by mass, both inclusive.

7. A method for producing a dyed article, comprising:
    applying the sublimation transfer ink according to claim 1 to an intermediate transfer medium by an ink jet process; and
    transferring the sublimation dye contained in the sublimation transfer ink to a substrate by heating the intermediate transfer medium, to which the sublimation transfer ink has been applied, with the intermediate transfer medium facing the substrate.

8. A method for producing a dyed article, comprising:
    applying the sublimation transfer ink according to claim 2 to an intermediate transfer medium by an ink jet process; and
    transferring the sublimation dye contained in the sublimation transfer ink to a substrate by heating the intermediate transfer medium, to which the sublimation transfer ink has been applied, with the intermediate transfer medium facing the substrate.

9. A method for producing a dyed article, comprising:
    applying the sublimation transfer ink according to claim 3 to an intermediate transfer medium by an ink jet process; and
    transferring the sublimation dye contained in the sublimation transfer ink to a substrate by heating the intermediate transfer medium, to which the sublimation transfer ink has been applied, with the intermediate transfer medium facing the substrate.

10. A method for producing a dyed article, comprising:
    applying the sublimation transfer ink according to claim 4 to an intermediate transfer medium by an ink jet process; and
    transferring the sublimation dye contained in the sublimation transfer ink to a substrate by heating the intermediate transfer medium, to which the sublimation transfer ink has been applied, with the intermediate transfer medium facing the substrate.

11. A method for producing a dyed article, comprising:
    applying the sublimation transfer ink according to claim 5 to an intermediate transfer medium by an ink jet process; and
    transferring the sublimation dye contained in the sublimation transfer ink to a substrate by heating the intermediate transfer medium, to which the sublimation transfer ink has been applied, with the intermediate transfer medium facing the substrate.

12. A method for producing a dyed article, comprising:
    applying the sublimation transfer ink according to claim 6 to an intermediate transfer medium by an ink jet process; and transferring the sublimation dye contained in the sublimation transfer ink to a substrate by heating the intermediate transfer medium, to which the sublimation transfer ink has been applied, with the intermediate transfer medium facing the substrate.

13. The method for producing a dyed article according to claim 7, wherein the intermediate transfer medium is heated at a temperature of 160° C. to 220° C., both inclusive.

14. A dyed article produced using the sublimation transfer ink according to claim 1.

15. A dyed article produced using the sublimation transfer ink according to claim 2.

16. A dyed article produced using the sublimation transfer ink according to claim 3.

17. A dyed article produced using the sublimation transfer ink according to claim 4.

18. A dyed article produced using the sublimation transfer ink according to claim 5.

19. A dyed article produced using the sublimation transfer ink according to claim 6.

* * * * *